United States Patent [19]

Robinson, Sr.

[11] 4,307,119
[45] Dec. 22, 1981

[54] PROCESS FOR MAKING A FEED PRODUCT

[76] Inventor: Jim D. Robinson, Sr., P.O. Box 317, Sandersville, Miss. 39477

[21] Appl. No.: 54,621

[22] Filed: Jul. 3, 1979

[51] Int. Cl.³ ............................................. A01K 43/00
[52] U.S. Cl. ..................................... 426/231; 426/614; 426/646; 426/647; 426/807; 426/233; 426/644
[58] Field of Search ................. 426/2, 623, 630, 635, 426/636, 807, 614, 641, 644, 647, 486, 657, 646, 231, 233; 99/467, 472, 443 C; 241/282.1, DIG. 14; 406/145, 151, 152, 153; 141/65, 67

[56] References Cited

U.S. PATENT DOCUMENTS

| | | | |
|---|---|---|---|
| 1,254,317 | 1/1918 | Faust | 426/472 |
| 2,418,311 | 4/1947 | McFarlane | 426/657 |
| 2,742,488 | 4/1956 | Dufault | 99/467 |
| 3,743,192 | 7/1973 | Otto | 241/282.1 |
| 3,961,096 | 6/1976 | Emanuel | 426/644 |
| 3,971,306 | 7/1976 | Wiese et al. | 426/471 |
| 4,000,861 | 1/1977 | Grebe et al. | 241/282.1 |
| 4,063,460 | 12/1977 | Svensson | 141/65 |
| 4,180,592 | 12/1979 | Buckley et al. | 426/647 |

FOREIGN PATENT DOCUMENTS

592002  9/1947  United Kingdom ................. 141/65

*Primary Examiner*—Joseph M. Golian
*Assistant Examiner*—George C. Yeung
*Attorney, Agent, or Firm*—George R. Douglas, Jr.

[57] ABSTRACT

Method for processing and manufacture of chicken feed in using hatchery waste products, egg shells, dead chickens and spoiled eggs, blood, offal, by-products of waste water treatment, and fat in which there is a tank to provide intake and mix the various ingredients of a chicken feed, feeding mixed ingredients to cooker or dryer tanks or ovens over a vacuum line, and providing for ancillary or auxiliary venting through a vacuum blood storage tank, and in which hatchery waste and other material can be conveniently inmixed into a receiver tank in mixing ingredients for cooking into a chicken or animal feed.

7 Claims, 1 Drawing Figure

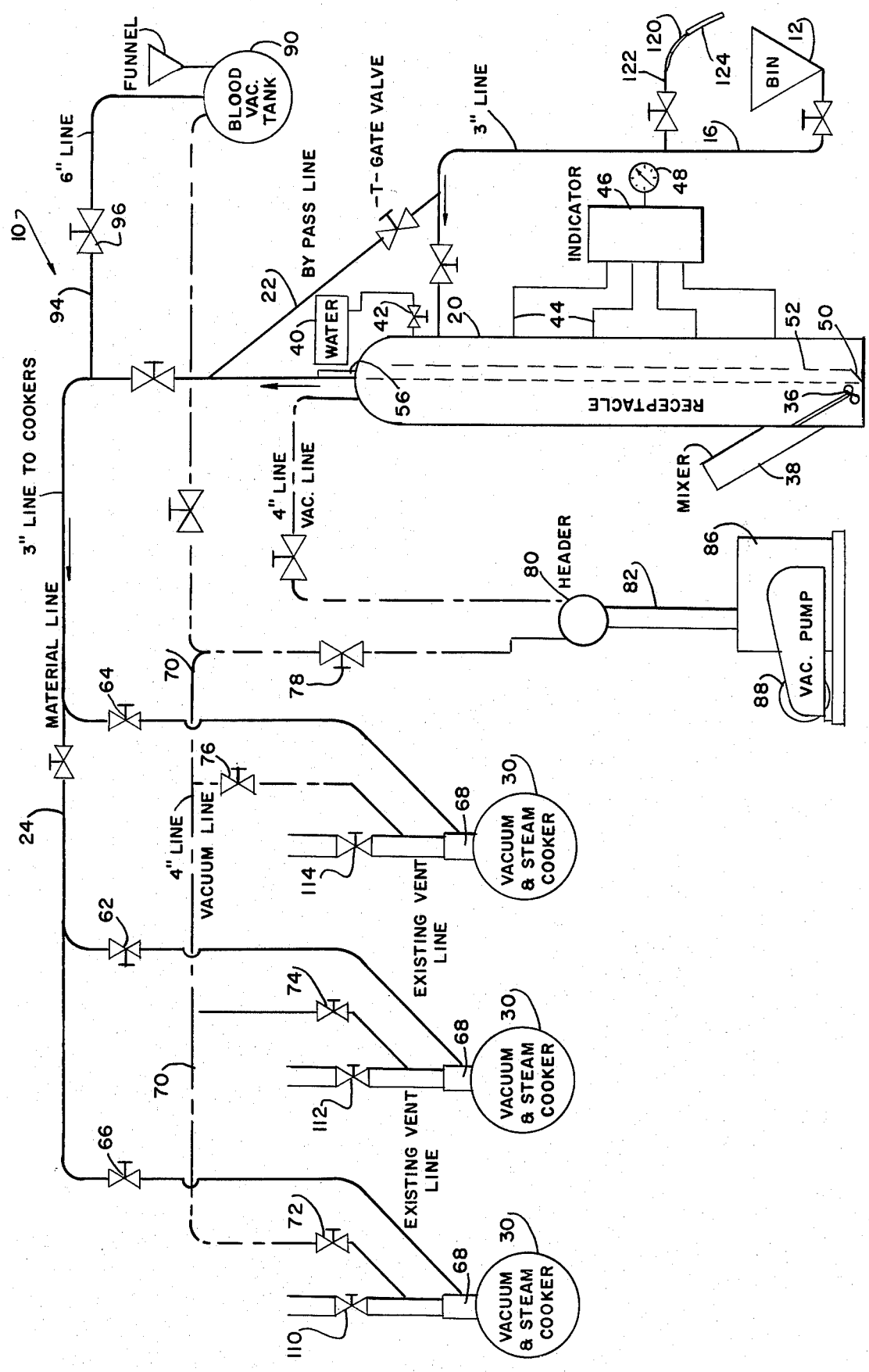

PROCESS FOR MAKING A FEED PRODUCT

CROSS-REFERENCES TO PRIOR ART DISCLOSURES AND REFERENCES

The present invention is an improvement in apparatus and method over processes and structures shown in the following U.S. Patents:

| U.S. PAT. NO. | INVENTOR |
|---|---|
| 1,254,317 | Faust |
| 2,418,311 | McFarlane, et al. |
| 3,961,096 | Emanuel |
| 3,971,306 | Wiese, et al. |

These patents show no more than using egg shells, feathers and other nutrients so blended for making a feed, or that water and feces may be added to stock feed.

BRIEF SUMMARY OF THE INVENTION

The present invention relates to a process and method of making a feed product containing egg shells, dead chickens, unhatched eggs, feathers, blood, offal, by-products of waste water treatment, fat and the like which are mixed in a tank with water or steam, and more particularly the invention relates to such a process in which there is an improved material handling system so that heavy products such as egg shells which are usually about 1½ times heavy as water and which will settle rapidly do not cause a handling problem for the reason that the material is conveyed under substantial vacuum pressures that provide movement of the product through a line from admixture receptacle to a steam cooker for processing and distribution as an animal feed or food product.

BACKGROUND OF THE INVENTION

Prior to the present time it has been found necessary to process hatchery waste products such as egg shells, dead chickens and spoiled eggs by one of three methods as follows: (1) to incinerate the waste products and haul ashes remaining to a land fill, or (2) to haul the unusable product to a land fill and bury it in its raw state, or (3) to haul it to a rendering plant in an open truck and dumping it into a conveyor or screw-conveyor means for conveying it into a cooker for processing into animal feeds.

The prior art arrangements provide a consumption of excessive amounts of energy for incineration, for hauling, for exerting labor costs, and other incident expenditures of energy and cost so that there has been an environmental problem resulting from the collection of these products. Also the environmental problem includes spillage from the open trucks, air pollution, or have caused employee relations and community problems which no one wanted to find a solution for. Further, there has been no prior art method of metering the amount of the material that was placed into a cooker at a rendering plant or other means for controlling on order the calcium content of the finished feed product or animal feed from the rendering plant.

The product of the present invention contains egg shells, dead chickens, unhatched eggs and the like and are mixed with water, processed through a vacuum line into a cooker for steam heating and providing a resultant food product or animal feed.

FIELD OF THE PRESENT INVENTION

The present system will make provision for receiving hatchery waste and other materials from a tank truck or conveyor for receiving hatchery waste material, storing it until it is needed and then injecting a measured amount from a receptacle where it is made into an admixture of small particles or particulate material, vacuum passing through a pipe material from the lower confines of the receptacle into one or more steam cookers where it is subject to a measured amount of sealed steam pressure for processing into a food product or animal feed. The major components of the system include a 1,000 gallon vertical tank or substantially vertical tank, a vacuum pump of significant size and one or more 5'×16' horizontal steam heated cookers. The pump is sufficient in pressure to draw a vacuum through the steam cooker and into the receptacle for drawing the particulate into the steam cooker. Four or more electrodes or measuring devices are installed in the side of the tank for indicating the liquid level inside of the tank or receptacle.

As the hatchery waste material is vacuumed or drawn off under vacuum pressure from a bin into the tank or receptacle, the material is then stored in the upright tank until it is needed to be drawn off through a pipe connecting with a material line fed to one or more steam cookers. When the operator is ready to bleed it off under vacuum pressure into one of the cookers, the cooker is put under a vacuum by turning a selective appropriate valve and the waste product is sucked into the cooker and cooked with other products controlled by the operator.

The process of the present invention has at least two stages or cycles in which the first is for loading a storage tank or receptacle by vacuum means and the second stage is to remove or pass under vacuum pressure the particulate material from the receptacle to one or more steam cookers for processing, and in which the vacuum processing is accomplished by a common vacuum pump means.

In the bottom of the tank discharge or receptacle there is a pipe cut at a 45° angle and which faces away from the mixer or mechanical blade stirring means and faces away from the mixer. The stirring means provides constant agitation of the product and comminutes the material into small particulate material. The tank or receptacle has a pipe coming down into its lower regions at the center thereof and draws through the 45° angle pipe face the particulate material that are picked up and drawn into one or more steam cookers.

Within the scope of the invention there can be a paddle arrangement or similar stirring means that push the material around and in front of the vacuum pipe that connects with a steam cooker.

Within the confines and teaching of the present invention it is seen that there can be other materials handled in a similar way for handling waste materials and for providing an improved material handling system.

The invention also includes a bypass line for allowing the operator to pull waste material directly from a bin into one or more of the steam cookers or for drawing the contents of the bin directly into the large receptacle. Within the scope of the invention the steam cookers may be denominated processing vessels or processing receptacles such that heat, steam and vacuum together operate upon the internal aggregate product or material therein for forming a food product or animal feed.

Within the purview of the invention other waste material handling may be achieved where vacuum and steam heating processing of particulate materials is required.

SUMMARY OF THE INVENTION

An object and advantage of the present invention is to provide a material handling system for the admixture of poultry waste products and the like in a tank receptacle, withdrawing therefrom by a vacuum means admixed particulate material from a lower end of the receptacle and passing the withdrawn admixed particulate into a vacuum steam heated cooker for conditioning the particulate into an animal edible feed or food product.

A further object of the invention is to provide a common vacuum means for processing passage of particulate material from a bin and/or receptacle through a material line into a vacuum and steam heated cooker for processing particulate material into a food product or an animal edible feed.

The above and other objects and advantages of the invention will become apparent upon full consideration of the following detailed description and accompanying drawings in which:

The FIGURE is a schematic and system diagram of the material handling system according to a given preferred embodiment of the present invention.

DETAILED DESCRIPTION OF THE PREFERRED EMBODIMENT OF THE INVENTION

Referring now to the drawing there is shown a material handling system 10 having a collector bin 12 for receiving incoming material that is collected in the bin by dumping from a closed truck or other sources such as may be conveyed from locations in a hatchery housing, a material conveyor line 16 for passing under vacuum pressure hatchery waste material from the bin to a tank receptacle 20 or through a bypass line 22 to a main material line 24. The line 24 may be a 3" pipe for feeding processed material or particulate hatchery material granular in nature to one or more vacuum and steam heated cookers 30, 30, 30.

The material in bin 12 may be any of an admixture of egg shells, spoiled eggs, unhatched eggs, feathers, dead chicks, chicken feces and other poultry waste products and by means of the material line 16, which is generally sufficiently large in diameter for passing material into the tank receptacle 20, there is a collection and general filling thereof so that the material collecting at the near bottom is comminuted, ground and add mixed together by a rotating mechanical blade elements 36 which may be driven by a motor 38. Any necessary water or moisture that need be added to the receptacle 20 may be applied by a water supply 40 connected through a line 55 and valve 42.

Indication of the level of commuted or uncommuted raw material in the receptacle tank is provided by probe or electrode means 44, 44 which provide signals to indicator element 46 providing an indication on meter 48.

The rotating mechanical blade element 36 are disposed at the lower end of the receptacle for stirring, comminuting and driving the resulting admixture of particulate material and resulting finely divided particulate toward a pipe 50 having its opening disposed away from the blade elements 36 by a 45° bias with respect to the vertically extending pipe 52. The pipe 52 connects with the main material line 24 by passing through the receptacle 20 at connection 56 and due to the significant substantial vacuum pressure on the main line 24, the finely divided particulate material at the bottom of the receptacle 20 is withdrawn and passes through the main line 24 to one or more of a selective number of vacuum and steam heated cookers 30, 30, 30. Valves 62, 64, 66 are seen to selectively direct the comminuted and finely divided particulate material into a given cooker depending upon the opening and closure states or conditions of the valves 62, 64, 66. The main material line 24 terminates in the cookers by connecting at the upper or an elevated portion 68 of the cooker.

The vacuum line connected through the material line 24 passes through the portion 68 into a vacuum line 70 including valves 72, 74, 76 and 78 terminating in a header 80 coupled directly to a pipe 82 to a vacuum pump 86. The vacuum pump is driven by a motor 88.

There is provided a blood storage tank 90 coupled through a 6" line 94 and valve 96.

Each of the dryers or cookers 30, 30, 30 also have a vent line that provides for opening the cooker to the atmosphere through a coupling and valve 110, 112, 114.

It is seen that the vacuum condition and pressure drawn by the pump 86 draws the pressure through header 80, the vacuum line 70, 70 through the cooker or cookers 30 and the main line 24 into either the bin 12 by the bypass line 22 or into the receptacle through pipe 52 which draws the finely divided particulate material through the bias face 50 of the pipe 52 for thereby resultingly draw hatchery wastes product into a flow from the bin and/or receptacle 20 into each of the selected several cookers 30, 30.

In lieu of or in addition to bin 12, a hose 120, pipe 122 and a suction pipe 124 may be used to draw out the contents of a material container mounted on a truck (not shown).

It is seen by the process and method of the apparatus of the present invention that there is a new vacuum and steam heated cooker for processing finely divided particulate animal material which draws its source material from a receptacle tank or a bin and which is driven by a vacuum pump commonly connected to the cooker, the receptacle and the bin as well as blood storage tank.

Additional embodiments of the invention in this specification will occur to others and thereofore it is intended that the scope of the invention be limited only by the appended claims and not by the embodiments described hereinabove. Accordingly, reference should be made to the following claims in determining the full scope of the invention.

I claim:

1. A process for making a feed product comprising
feeding and coupling incoming material into a tank receptacle through a feed line connected to an upper location of said tank receptacle, said tank receptacle having a lower end,
feeding and coupling animal blood also into said tank receptacle through another feed line,
admixing said incoming material including egg shells, spoiled eggs, unhatched eggs, feathers, dead chicks, animal blood, offal, fat, and by-products of waste water treatment in said tank receptacle,
rotating mechanical blade elements disposed near said lower end of the tank receptacle for stirring up the admixture into a main line moving aggregate of finely divided particulate, withdrawing by vacuum means said main line moving aggregate admixed particulate from the lower end of the tank receptacle through a pipe extending downwardly into near the bottom of the tank receptacle beneath a level of said rotating mechanical blade elements, said pipe opens to the interior of said tank receptacle with an opening having a 45° cut and which opening faces away from said mechanical blade elements, passing the withdrawn main line moving aggregate admixed particulate through a wall of said tank receptacle, receiving the withdrawn main line moving aggregrate admixed particulate into a plurality of steam cooker members, heating the received main line moving aggregate admixed particulate under vacuum conditions where it is conditioned into animal edible feed, and, said heating step including processing said main line moving aggregate admixture under said vacuum conditions drawn through said tank receptacle and as well as through a series stage of the plurality of the steam cooker members and said tank receptacle.

2. The process of claim 1 wherein there is provided a steam heated cooker having vacuum pressure and being a closed, environmentally secure system for producing food product and animal feed from hatchery waste.

3. The process of claim 1 wherein indicator means are provided for showing content filling of the tank receptacle.

4. The process of claim 1 wherein said vacuum means is coupled to a vent line of said steam cooker members.

5. The process of claim 1 wherein water and moisture are added to said tank receptacle from a water supply connected by a line and a control valve.

6. The process of claim 1 wherein electrode probes disposed along said interior of said tank receptacle provide signals to an indicator element for measuring an indication of the level of the incoming material in the tank receptacle.

7. The process of claim 1 wherein a hose and pipe and a suction pipe are used to draw out contents of material containers connected to said feed line.

* * * * *